United States Patent
Brunetto

(10) Patent No.: US 6,294,240 B1
(45) Date of Patent: *Sep. 25, 2001

(54) PROTECTIVE COVER FOR VEHICLE FLOOR MAT

(76) Inventor: Joseph J. Brunetto, 24 Overlook Rd., Dobbs Ferry, NY (US) 10522

( * ) Notice: Subject to any disclaimer, the term of this patent is extended or adjusted under 35 U.S.C. 154(b) by 0 days.

This patent is subject to a terminal disclaimer.

(21) Appl. No.: 09/247,476

(22) Filed: Feb. 8, 1999

Related U.S. Application Data

(63) Continuation-in-part of application No. 08/879,435, filed on Jun. 20, 1997, now Pat. No. 5,914,169.

(51) Int. Cl.[7] .................................................. B32B 3/06
(52) U.S. Cl. .................................. 428/99; 5/417; 5/495; 5/496; 5/497; 15/215; 15/216; 15/217; 428/68; 428/95; 428/102; 428/192; D12/203
(58) Field of Search ........................ 428/99, 102, 68, 428/192, 95; 15/216, 215, 217; 5/417, 496, 497, 495; D12/203

(56) References Cited

U.S. PATENT DOCUMENTS

| | | | |
|---|---|---|---|
| 3,663,980 | * 5/1972 | Conklin | 15/215 |
| 5,914,169 | * 6/1999 | Brunetto | 428/99 |
| 6,073,283 | * 6/2000 | Zheng | 5/417 |

* cited by examiner

*Primary Examiner*—Nasser Ahmad
(74) *Attorney, Agent, or Firm*—Lackenbach Siegel Marzullo Aronson & Greenspan

(57) ABSTRACT

A protective cover for a motor vehicle conventional floor mat comprising a removable fabric protectively enclosing the top side of the mat. An elastic strip integral with the inner rim of the cover removably engages the cover to the underside of the floor mat. The conventional floor mat has a mat irregular peripheral edge and the cover edge is custom fitted to the mat irregular peripheral edge. A cover shape-retaining element integral with the cover side edge keeps the conforming relationship of the cover side edge with the irregular peripheral edge of the floor mat. An elastic strip unitary with the cover inner rim allows the cover to be disengaged from the floor mat by stretching the elastic strip to a biased mode. The cover is preferably made of a polyester pile fabric that generally matches the fabric used in motor vehicles. A waterproof layer is preferably attached to the interior surface of the cover.

10 Claims, 4 Drawing Sheets

PROTECTIVE COVER FOR VEHICLE FLOOR MAT

HISTORY OF THE INVENTION

This application is a continuation-in-part application of application Ser. No. 08/879,435 filed on Jun. 20, 1997 now U.S. Pat. No. 5,914,169, entitled "Protective Cover for Vehicle Floor Mat", which was allowed on Nov. 6, 1998.

FIELD OF THE INVENTION

This invention relates to the field of car floor mats and more particularly to protective covers for car floor mats.

BACKGROUND OF THE INVENTION

Pairs of flexible, waterproof floor mats are designed and fabricated by car manufacturers for each model of car. Car floor mats are intended to protect the floor carpeting of the vehicle from staining, discoloration, or adhering materials such as tar, oil, gum, and various foods. The floor mat itself, however, is commonly contaminated with material that is unsightly and cannot be completely removed such as gum, oil, or tar, or with substances that create odors that cannot be totally eliminated, such as those made by spilled substances or pets, so that the interior of the car becomes unsightly or unpleasant. In such a case, the user of the vehicle often prefers to discard such a contaminated mat. Car manufacturers usually offer replacement mats custom made for designated models, often in pairs. The cost, although not high, is yet not inexpensive. Non-custom made vehicle floor mats are available, but these mats also can be somewhat costly.

Conventional car floor mats vary in configuration in accordance with vehicle models, but it can be said that all car floor mats are somewhat irregular in configuration. Also, custom mats have variously dimensioned outer edges that fit around variously positioned vehicle mechanisms. These edges can be rectangular or curvilinear in configuration.

Replaceable covers for floor mats in general are known in the art. One such cover is described in U.S. Pat. No. 3,663,980, issued May 23, 1972 to Conklin. This patent discloses a soft fabric cover that encloses the top side of a door mat and also removably secured to the underside of the mat by a hook fabric fastener strip engaged by a strip of matted fabric attached to the underside of the door mat.

SUMMARY OF THE INVENTION

One object of both the invention designated application Ser. No. 08/879435 and the present continuation-in-part application is to provide an easily removable, cleanable, and reusable protective cover for a floor mat of a motor vehicle.

An object of the invention designated application Ser. No. 08/879435 is to provide a protective cover for a motor vehicle conventional floor mat comprising a removable fabric protectively enclosing the top side of the mat. An elastic strip integral with the inner rim of the cover removably engages the cover to the underside of the floor mat. The conventional floor mat has a mat irregular peripheral edge and the cover edge is custom fitted to the mat irregular peripheral edge. An elastic strip unitary with the cover inner rim allows the cover to be disengaged from the floor mat by stretching the elastic strip to a biased mode. The cover is preferably made of an uncut pile fabric such as terry cloth. A waterproofing layer is preferably attached to the interior surface of the cover.

Another object of both the invention designated application Ser. No. 08/879435 and the present continuation-in-part application is to provide a protective cover for a standard vehicle floor mat that can be easily secured to the floor mat and easily disengaged from the floor mat and thereupon washed and then easily remounted to the floor mat.

Yet another object of the invention designated application Ser. No. 08/879435 and the present continuation-in-part application is to provide a custom fit cover for a conventional floor mat of a vehicle that conforms to the peripheral configuration of the floor mat and that can be engaged to the floor mat and easily removed and cleaned and resecured to the floor mat.

An object of the present continuation-in-part invention is to provide a protective cover for a motor vehicle conventional floor mat that is made of a flexible protective material made is such a way that the basic shape of the cover is retained during use and tends to return to a basic configuration even when somewhat deformed during hard use.

Another object, of the present continuation-in-part invention is to provide a protective cover for a motor vehicle conventional floor mat that covers the entire top surface area of the floor mat and in addition a sufficient area of the underside of the floor mat so as to reliably retain the protective cover in its hold on the floor mat and yet leave uncovered a sufficient area of the downwardly facing non-skid configuration surface of the floor mat that its bottom side retains its non-skid grip relative to the floor board area of the motor vehicle.

Another object of the present continuation-in-part invention is to provide a protective cover for a motor vehicle conventional floor mat that is made of a material that is easily removable from the floor mat and washable in a conventional member.

Another object of the present continuation-in-part invention is to provide a protective cover for a motor vehicle conventional floor mat that is made of a protective material that blends in with the basic fabric used on the floors of motor vehicles.

Another object of the present continuation-in-part invention is to provide a protective cover for a motor vehicle convention floor mat that is easily removable from and mountable to the floor mat yet retains a snug position relative to the protective floor mat even during hard usage.

Another object of the present continuation-in-part invention is to provide a protective cover for a motor vehicle that is unitary in final configuration yet is inexpensive to manufacture.

Another object of the present continuation-in-part invention is to provide a protective cover for a standard vehicle floor mat that can be easily secured to the floor mat and easily disengaged from the floor mat and thereupon washed and then easily remounted to the floor mat.

Yet another object of the present continuation-in-part invention is to provide a custom fit cover for a conventional floor mat of a vehicle that conforms to the peripheral configuration of the floor mat and that can be engaged to the floor mat and easily removed and cleaned and reengaged to the floor mat.

In the course with these and other objects that will become apparent in the course of this disclosure, there is provided in application Ser. No. 08/879435 a protective cover for a motor vehicle conventional floor mat comprising a removable fabric protectively enclosing the top side of the mat. An elastic strip integral with the inner rim of the cover removably engages the cover to the underside of the floor mat. The conventional floor mat has a mat irregular peripheral edge and the cover edge is custom fitted to the mat irregular peripheral edge. An elastic strip unitary with the cover inner rim allows the cover to be disengaged from the floor mat by stretching the elastic strip to a biased mode. The cover is preferably made of an uncut pile fabric such as terry cloth. A waterproofing layer is preferably attached to the interior surface of the cover.

There is also provided for the present continuation-in-part application a protective cover for a motor vehicle conventional floor mat comprising a removable fabric protectively enclosing the top side of the mat. The conventional floor mat has a floor mat irregular peripheral edge and the cover edge is custom fitted to the floor mat irregular peripheral edge. A cover shape-retaining element integral with the cover side edge keeps the conforming relationship of the cover side edge with the irregular peripheral edge of the floor mat. An biasable elastic strip unitary with the cover inner rim allows the cover to be disengaged from the floor mat by stretching the elastic strip to a biased mode. The cover is made of a polyester pile fabric that generally matches the fabric used in motor vehicles. The interior surface of the cover is waterproof.

The following domestic patents were cited in the parent application of the present application: U.S. Pat. No. 5,358,768 issued to Wiley, III on Oct. 25, 1994; U.S. Pat. No. 5,316,817 issued to Timperley on May 31, 1994; U.S. Pat. No. 5,236,753 on Aug. 17, 1993; U.S. Pat. No. 5,028,468 issued to Taylor on Jul. 2, 1991; U.S. Pat. No. 4,876,135 on Oct. 24, 1989; U.S. Pat. No. 4,686,721 on Aug. 18, 1987; and U.S. Pat. No. 2,919,456 issued on Jan. 5, 1960.

The present invention will be better understood and the objects and important features, other than those specifically set forth above, will become apparent when consideration is given to the following details and description, which when taken in conjunction with the annexed drawings, describes, illustrates, and shows preferred embodiments or modifications of the present invention and what is presently considered and believed to be the best mode of practice in the principles thereof.

Other embodiments or modifications may be suggested to those having the benefit of the teachings therein, and such other embodiments or modifications are intended to be reserved especially as they fall within the scope and spirit of the subjoined claims.

DESCRIPTION OF THE PREFERRED EMBODIMENT

Figure 1:
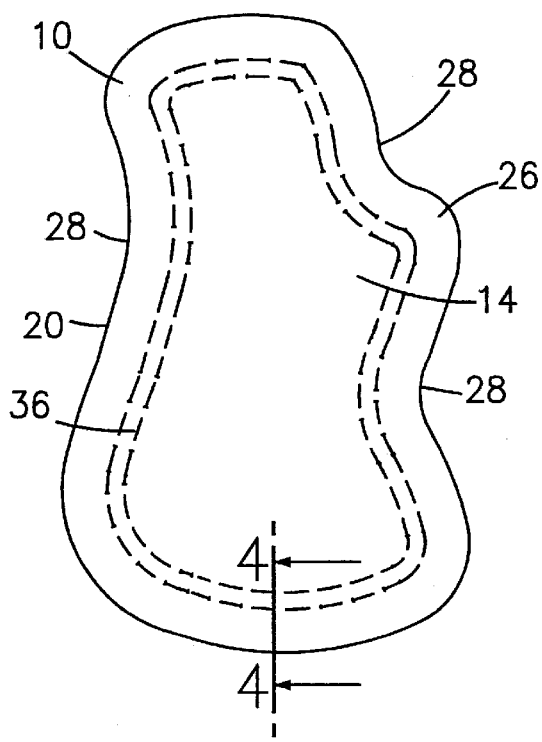
FIG. 1 is a top view of the inventive protective cover enclosing a floor mat of a motor vehicle.

Reference is now made in detail to the drawings wherein the same numerals refer to the same or similar elements throughout.

A removable protective cover 10 for a conventional floor mat 12 for a motor vehicle is shown in FIGS. 1, 2, 3, 4, and 5. Cover 10 includes a cover top side 14 that covers and protects mat top side 16. In addition cover 10 includes a cover side edge 20 that is custom fitted to peripheral edge 18 of mat 12. Also, cover 10 includes a cover bottom side 22 that extends across a portion of mat underside 24.

Figure 2:
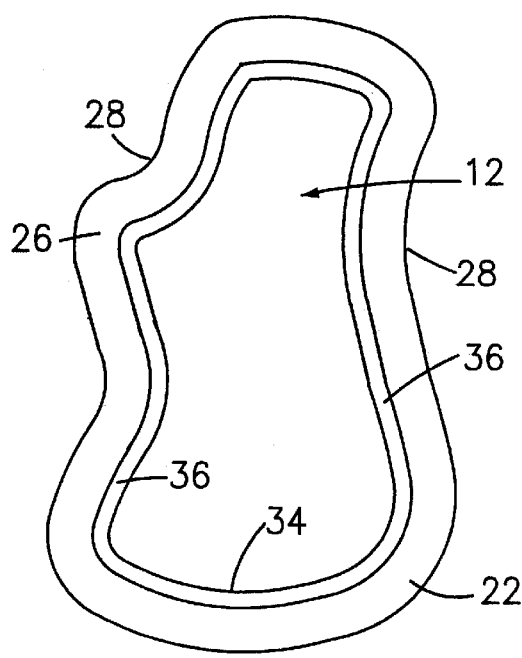
FIG. 2 is a bottom view of the cover with floor mat shown in FIG. 1.

Mat peripheral edge 18 is shown as irregular in configuration with curved convex edge areas 26 and curved concave edge areas 28 for purposes of exposition. Floor mat 12 as illustrated in FIGS. 1 and 2 does not represent a particular type of vehicle floor mat but rather is an illustrative composite of many types of conventional vehicle floor mats. Such conventional floor mats are configured to accommodate a broad spectrum of vehicle manufacturers and models. In fact, many vehicle floor mats do not have curved areas but often are in fact linear in configuration. In addition, mat underside 24 includes a flat bottom surface 30 with regularly positioned downwardly extending nipple projections 32 that are common in standard vehicle floor mats for purposes of spacing mat bottom surface 30 from a wet vehicle floor. It is to be understood that nipple projections 32 may not always be present in conventional floor mats and are described herein merely to emphasize that the present invention relates to all types of conventional vehicle floor mats.

Figure 5:
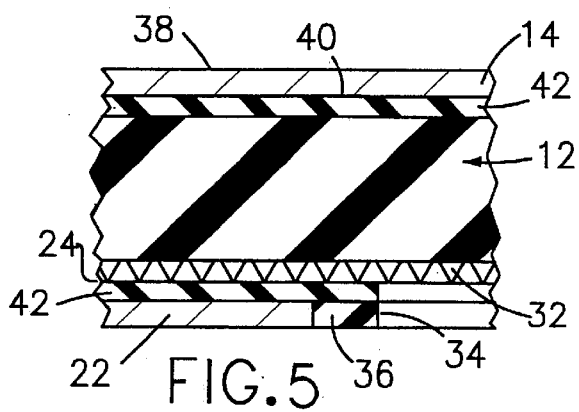
FIG. 5 is an enlarged view of a portion of the view shown in FIG. 4 that includes the woven elastic at the periphery of the cover.

Cover bottom side 22 lies across an outer area of mat underside 24 and includes a cover inner rim 34 that is in snug relationship with mat peripheral edge 18. As best seen in FIGS. 2 and 5, cover inner rim 34 includes a generally oblong continuous biasable strip 36 that is integral with cover 10 along cover inner rim 34. Cover inner rim 34 in general maintains a minimum and predetermined distance from mat peripheral edge 18 sufficient to secure cover 10 to floor mat 12. Cover 10 is removably secured to floor mat 12 by action of biasable strip 36 in the unbiased mode. Cover 10 can be disengaged from floor mat 12 by the user forcing biasable strip 36 from the unbiased mode outwardly to a biased mode so that cover inner rim 34 is stretched to an enlarged distance sufficient to pass cover inner rim 34 beyond mat peripheral edge 18 thus allowing the removal of the entirety of cover 10 from floor mat 12.

Cover 10 is flexible and made of a fabric that is capable of absorbing moisture and holding dirt and other materials. Such fabric is preferably a piled, uncut, looped fabric material, known as terry or terry cloth. Other materials that have equivalent protective or absorbent characteristics can be used. Cover 10 can be washed and dried as is possible with any terry cloth towel and then remounted to floor mat 12. Biasable strip 36 is made of an elastic that is interwoven into integral and unitary union with cover 10.

Figure 6:
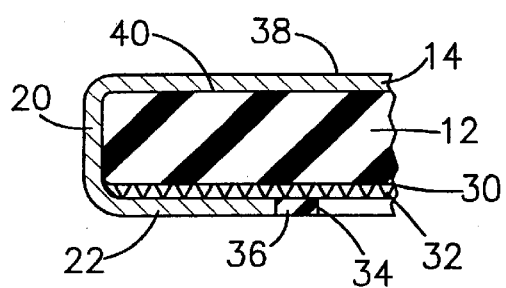
FIG. 6 is a view analogous to the view shown in FIG. 4 but without the layer of waterproofing material.

Cover 10 includes an exterior surface 38 that is the actual piled fabric of cover 10. Cover 10 also includes an interior surface 40 opposite to exterior surface 38. Interior surface 40 can be an untreated surface, such as is illustrated in FIG. 6.

Figure 4:
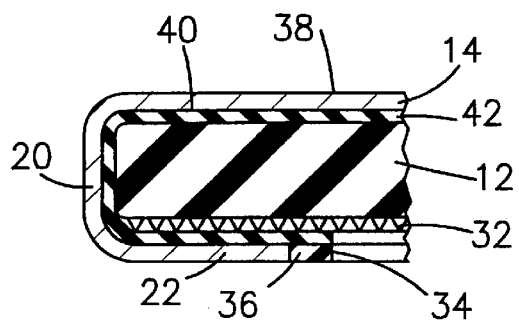
FIG. 4 is a sectional view taken through line 4—4 in FIG. 1 with the cover including an inner layer of waterproofing material affixed to the cover.
Figure 3:
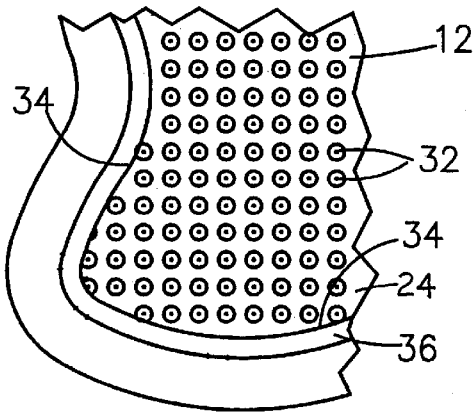
FIG. 3 is an enlarged view of the lower left hand portion of the cover and floor mat shown in FIG. 2.

Interior surface 40 can also be covered with a water-proofing layer 42 as illustrated in FIG. 4. In addition, cover interior surface 40 can be treated with a water-proofing agent that becomes integral with interior surface 40 that performs the same function as water-proofing layer 42.

FIGS. 2, 3, 4 and 5, floor mat 12 illustrate the plurality of regularly spaced downwardly extending nipple projections 32 that are unitary with mat bottom surface 30. Nipple projections 32 are in direct contact with the floor of the motor vehicle. In FIG. 4 water-proofing layer 42 along cover bottom side 22 is in contact with a portion of the plurality of nipple projections 32. In FIG. 6, cover interior surface 40 is in contact with a portion of the plurality of nipple projections 32.

Cover convex portion 26 and cover concave portion 28 are positioned at predetermined minimum distances from the mat irregular peripheral edge 18 so that cover 10 is maintained in a mounted relationship to floor mat 12.

Figure 7:
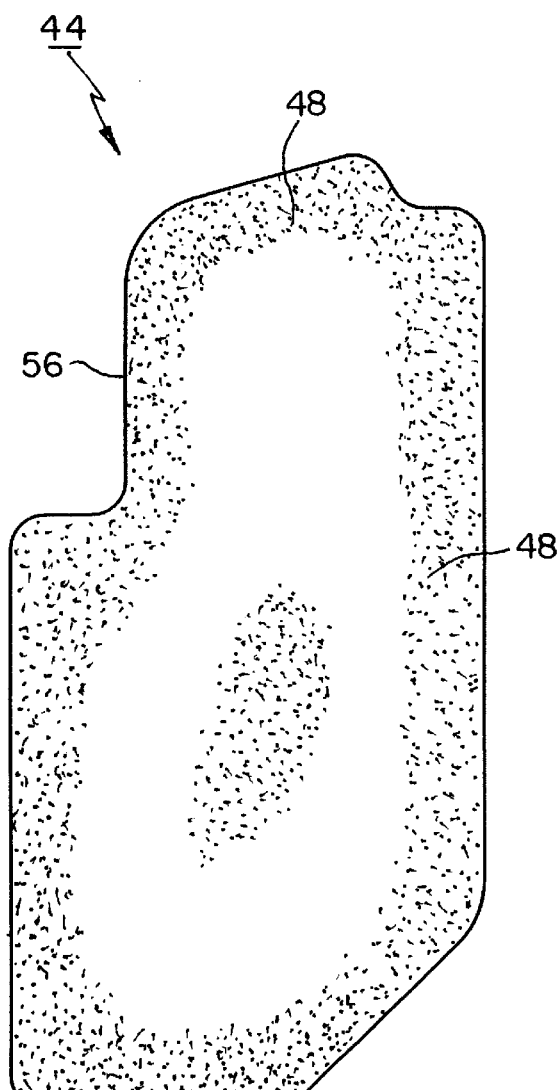
FIG. 7 is a top view of a second embodiment of a protective cover enclosing a conventional floor mat of a motor vehicle.
Figure 8:
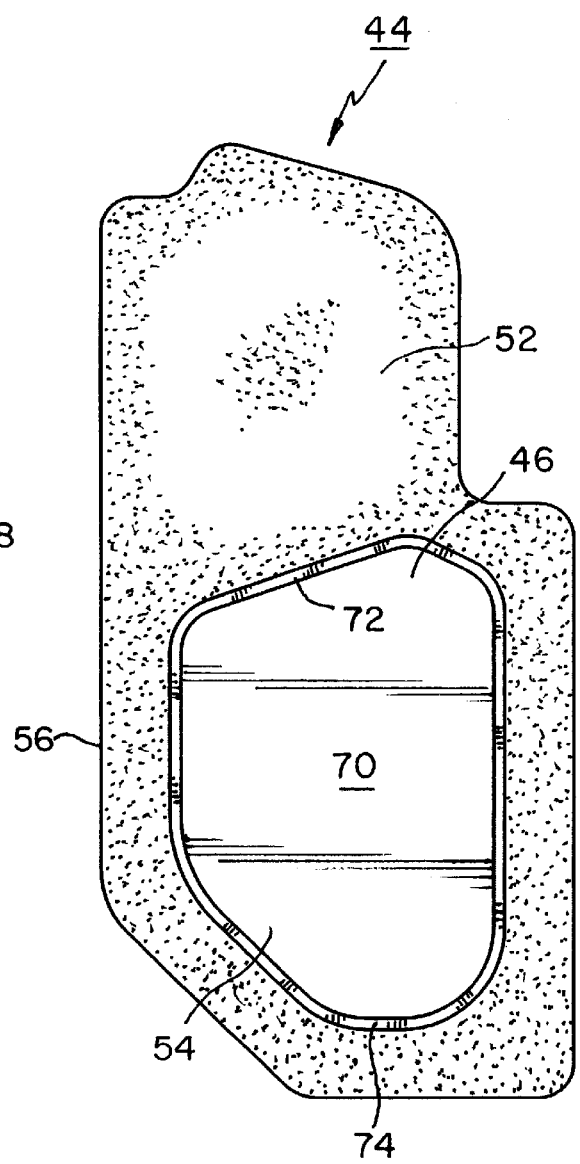
FIG. 8 is a bottom view of the second protective cover shown in FIG. 7.

Another removable protective cloth cover 44 for a conventional floor mat 46 for a motor vehicle is shown in FIGS. 7, 8, 9, 10, and 11. Protective cloth cover 44 is made of a flexible cloth material. Protective cloth cover 44 includes a cover top side 48 that completely and protectively encloses the top side 50 of floor mat 46 and a cover bottom side 52 that encloses a portion of the underside 54 of floor mat 46. Protective cover 44 further includes a cover side edge 56 that is integral with cover top side 48 and with cover bottom side 52. Cover side edge 56 encloses, conforms with, and is custom fitted to the irregular peripheral edge 58 of conventional floor mat 46. The particular irregular floor mat peripheral edge 58 shown in FIGS. 7 and 8 is selected for purposes of exposition only and is merely one of a number of configurations of possible floor mat irregular peripheral edges.

Protective cloth cover 44 includes cover top side 48, cloth cover bottom side 52 and cloth cover side edge 56 defining a cover inner pocket 60. As shown in FIGS. 7 and 8, protective cloth cover 44 comprises both cover top side 48 and cover bottom side 52. Cover top side 48 is coextensive with a cloth top side portion 48A that in turn is unitary with a top side cloth edge portion 48B positioned within inner pocket 60. Cover bottom side 52 is coextensive with a bottom cloth side portion 52A that in turn is unitary with a bottom side cloth edge 52B also positioned within inner pocket 60. Cloth cover 44 includes top side cloth edge portion 48B and bottom side cloth edge portion 52B being sewn together within pocket 60 to form a continuous cover shape-retaining element 62 integral with and positioned along the inner side of cover side edge 56. Cover shape-retaining element 62 serves to keep a conforming relationship of cover side edge 56 with irregular peripheral edge 58 of floor mat 46. Cover shape-retaining element 62 reduces any tendency of protective cloth cover 44 to wrinkle, buckle up, dart, and lump up, so that in general protective cloth cover displays a flat, unwrinkled surface at cloth cover top side 48.

Floor mat 46 including irregular peripheral edge 58 as illustrated in FIGS. 7–11 generally represents one type of conventional floor mat used on the floor of a motor vehicle in the area of the driver's seat but can change in details in configuration within the spirit of the present invention. Conventional motor vehicle floor mats are configured to accommodate a broad spectrum of motor vehicle models. Floor mat underside 54 includes a flat bottom surface 66 with regularly positioned downwardly extending nipple projections 68 that are common in standard motor vehicle floor mats for purposes of spacing floor mat flat bottom surface 66 from a wet vehicle floor. It is to be understood that nipple projections 68 may not always be present in conventional floor mats and are described herein merely to emphasize that the present invention relates to all types of conventional motor vehicle floor mats.

Figure 9:
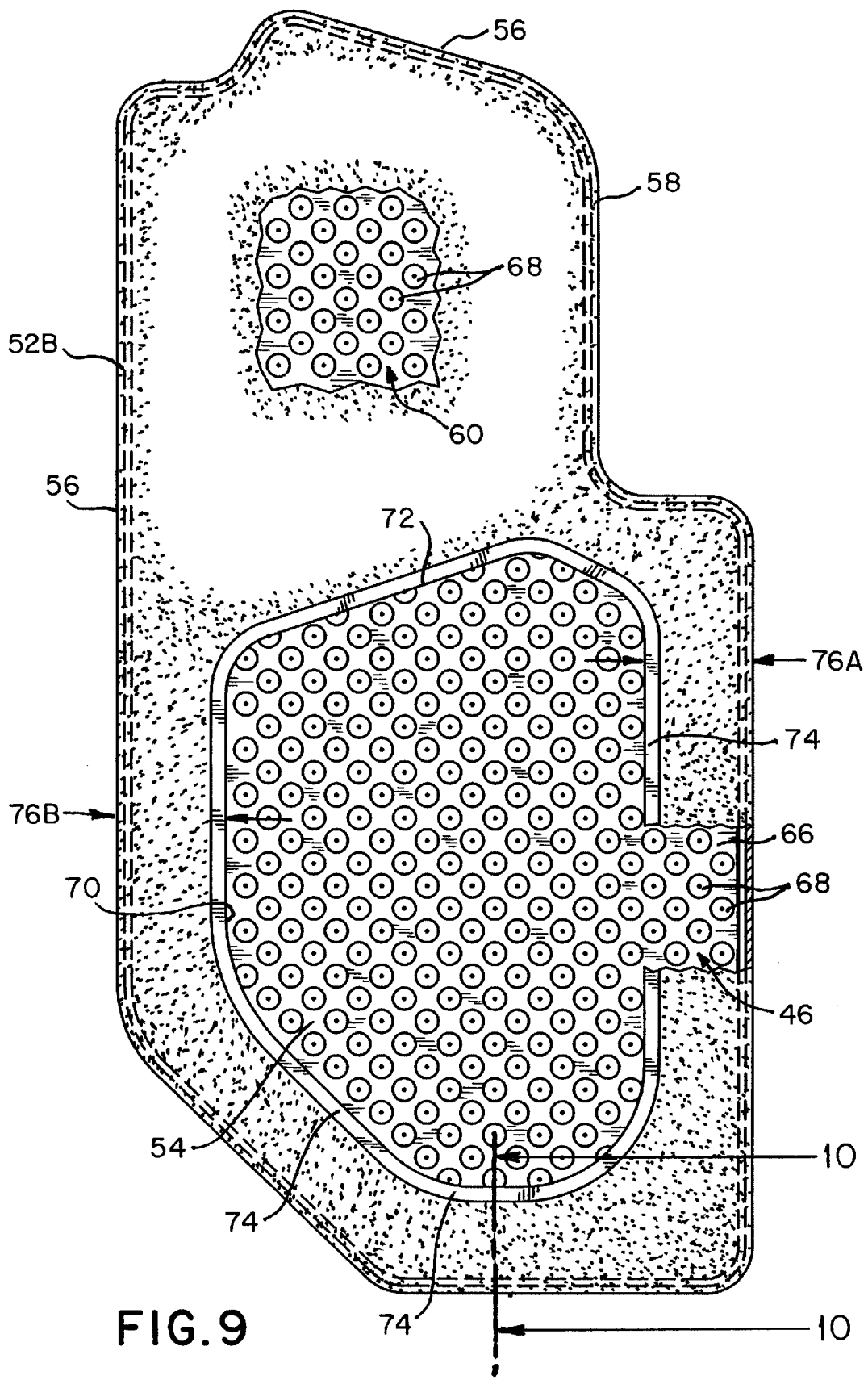
FIG. 9 is an enlarged bottom view of the second protective cover shown in FIG. 8.
Figure 10:
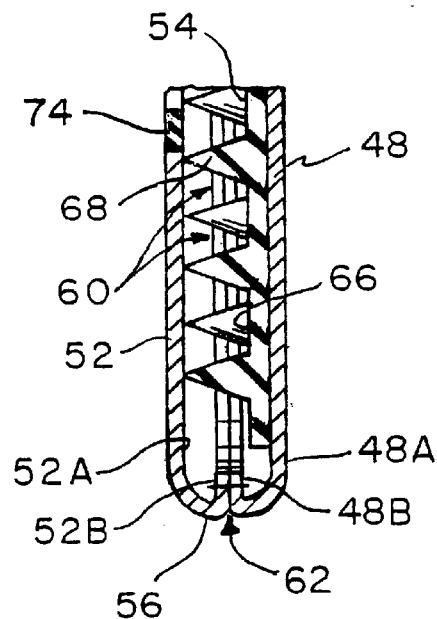
FIG. 10 is a sectional view taken through line 10—10 in FIG. 9.

As seen in FIGS. 7 and 8, cover bottom side 52 defines a hole, or aperture, 70 that is located in the area under the feet of the driver so that nipple projections 68 are in contact with the floor of the motor vehicle and protective cover 44 remains in place during use. As best seen in FIGS. 7 and 8, a cover inner rim 72 defines hole 70, which is irregular in shape. A continuous woven biasable/elastic strip 74 is coextensive with inner rim 72. Protective cover 44 is removably engaged to floor mat 46 by action of biasable/elastic strip 74 in the unbiased mode. Protective cover 44 can be disengaged from floor mat 46 by the user stretching biasable/elastic strip 74 from the unbiased mode outwardly to a biased mode so that bottom cover inner rim 72 is stretched to an enlarged configuration sufficient to pass cover inner rim 72 beyond floor mat peripheral irregular edge 58 thus disengaging protective cover 44 from floor mat 46 and further allowing the removal of the entirety of protective cover 44 from floor mat 46. Cover inner rim 72 in general maintains a predetermined minimal distance from floor mat irregular peripheral edge 58 sufficient to secure protective cover 44 to floor mat 46, that is, sufficient to inhibit or prevent any accidental disengagement of floor mat 46 from protective cloth cover 44. Such predetermined minimal distances shown as distances 76A and 76B in FIG. 9 are in the general range of 3 inches. Nipple projections 68 in the area of hole 70 are in direct contact with the floor of the motor vehicle and in addition nipple projections 68 not in the area of hole 70 are in direct contact with cloth cover bottom side 52.

Protective cover 44 is flexible and made of a fabric that is capable of absorbing moisture and holding dirt and other materials in addition is washable. Such fabric is preferably a plastic pile fabric in particular a polyester pile fabric that is uncut and in general is of such a quality and texture that generally matches the interior carpet material of a motor vehicle.

Figure 11:
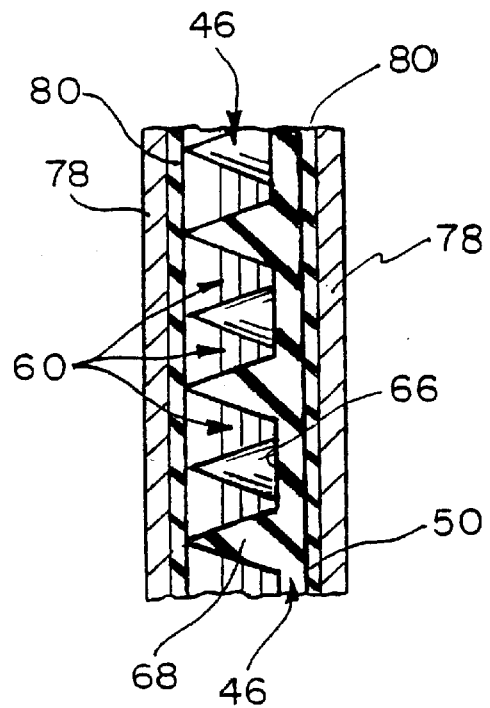
FIG. 11 is a greatly enlarged magnified fragmentary view of FIG. 10.

As shown in FIG. 11, protective cover 44 has a cover exterior area 78 and a cover interior surface 80 that is in contact with floor mat 46. Cover exterior area 78 is water absorbent so as to prevent excess water from rain or melting snow from bleeding from protective cover 44. Cover interior surface 80 is water resistant.

Although the present invention has been described in some detail by way of illustration and example for purposes of clarity and understanding, it will, of course, be understood that various changes and modifications may be made in the form, details, and arrangements of the parts without departing from the scope of the invention as set forth in the following claims. For example, cover shape-element retaining element 62 described hereinabove as being cloth top side edge portion 48B and cloth bottom side edge portion 52B being sewn together positioned along the inner side of cover side edge 56 within pocket 60 can be made in other ways. One such example of a shape-retaining element is cloth top side cloth edge portion 48B and cloth bottom side edge portion 52B being sewn together along the external side of cover side edge 56 external to pocket 60, generally indicated in the breakaway top view shown in FIG. 8 as well as locally indicated in FIGS. 10 and 11. Another example of a shape-retaining element is cover top side 48 and cover bottom side 52 being sealed along the external side of cover side edge 56 external to pocket 60 by a continuous connecting bead made of cloth or plastic.

What is claimed is:

1. A removable/washable protective cover in combination with a motor vehicle conventional floor mat having an irregular peripheral edge, comprising flexible cloth cover means for completely and protectively enclosing the top side of the floor mat and for enclosing a portion of the underside side of the floor mat, said cover including a cover inner rim defining an aperture in said underside of the floor mat, said cloth cover means further including a cover side edge enclosing and conforming with the irregular peripheral edge of the floor mat, cover shape-retaining means integral with said cover side edge for maintaining the conforming relationship of said cover side edge with the irregular peripheral edge of the floor mat, and securing means integral with said cloth cover means at said cover inner rim for removably engaging said cloth cover means to the floor mat.

2. The protective cover of claim 1, wherein said cloth cover means is a cloth cover having a cover top side completely enclosing the floor mat top side and a cover bottom side enclosing a portion of the underside of the mat, said cover side edge being integral with said cover top side and said cover bottom side, said cover shape-retaining means being a cover shape-retaining element integral with said cover side edge.

3. The protective cover of claim 2, wherein said cloth cover comprises a cloth top side having a cloth to side edge portion and a cloth bottom side having a cloth bottom side edge portion, and wherein said cover shape-retaining element is said cloth top side portion and said cloth bottom side portion being sewn together along said cover side edge.

4. The protective cover of claim 3, wherein said cloth cover includes said cover top side, said cloth cover bottom side, and said cover side edge defining a cover inner pocket, and wherein said cloth top side edge portion and said cloth bottom side edge portion are sewn together along said cover side edge within said cover inner pocket.

5. The protective cover of claim 2, wherein said securing means is a e woven biasable/elastic continuous fabric strip unitary with said cover at said cover inner rim, said biasable/elastic strip being biasable between biasable and unbiased modes, wherein in the unbiased mode said strip engages and holds said cover to the floor mat and when stretched to the biased mode, the cover is disengagable from the floor mat.

6. The protective cover of claim 1, wherein said cloth material is a plastic pile fabric.

7. The protective cover of claim 6, wherein said plastic pile fabric is a polyester pile fabric.

8. The protective cover of claim 7, wherein said plastic pile fabric is an uncut pile fabric.

9. The protective cover of claim 1, wherein said cloth cover has a cover exterior area and a cover interior surface, wherein said cover exterior area is water absorbent and said cover interior surface is water resistant.

10. The protective cover of claim 5, wherein said cover inner rim and the irregular peripheral edge of the floor mat are spaced apart at a predetermined minimal distance, said predetermined minimal distance being in the general range of 3 inches.

* * * * *